United States Patent [19]
Gilleo et al.

[11] Patent Number: 4,468,425
[45] Date of Patent: Aug. 28, 1984

[54] BOSS FORMATION USING LOW SURFACE ENERGY DAMS

[75] Inventors: Kenneth B. Gilleo; Willard H. Kreibich, both of Sparta, Wis.

[73] Assignee: Northern Engraving Corporation, Sparta, Wis.

[21] Appl. No.: 372,917

[22] Filed: Apr. 29, 1982

Related U.S. Application Data

[62] Division of Ser. No. 250,070, Apr. 1, 1981, Pat. No. 4,409,264.

[51] Int. Cl.[3] ........................ B32B 3/26; B05D 1/36
[52] U.S. Cl. ................................ 428/172; 428/156; 428/187
[58] Field of Search ................ 420/156, 13, 172, 187; 264/1.1

[56] References Cited

U.S. PATENT DOCUMENTS 2,370,028 2/1945 Freiberg .......................... 428/131
2,704,211 3/1955 Decepoli ........................... 428/13
4,353,858 10/1982 Gilleo et al. ..................... 428/156

*Primary Examiner*—Paul J. Thibodeau

[57] ABSTRACT

An article and its method of manufacture. The article comprises a base provided with a surface having a surface pattern. The surface pattern has at least one edge or boundary defined by at least one continuous retaining means. At least a portion of the retaining means is a contiguous low energy surface. The article additionally optionally comprises a volume or hardened resin covering only the surface pattern.

The method of the invention comprises forming the continuous retaining means comprising a contiguous low energy surface to define the boundary of the pattern area, introducing a liquid resin into the pattern area and hardening the resin to form an elevated boss.

7 Claims, 4 Drawing Figures

BOSS FORMATION USING LOW SURFACE ENERGY DAMS

RELATED APPLICATION

This application is a divisional application of Kenneth Burton Gilleo et al U.S. patent application Ser. No. 250,070 filed Apr. 1, 1981, now U.S. Pat. No. 4,409,264.

BACKGROUND OF THE INVENTION (a) Field of the Invention

This invention relates to forming a boss, i.e., an elevated area upon a surface and more particularly relates to the formation of such a boss upon a non-porous surface. The invention further relates to articles having such an elevated portion or boss.

(b) History of the Prior Art

The formation of protruding or elevated portions from surfaces have been of historical significance both for utilitarian and decorative purposes. Protruding portions from surfaces have been formed since before recorded history and, in fact, historical records themselves are frequently in the form of hieroglyphics or pictographs formed in elevation or relief in stone surfaces. A formation of such protruding surfaces in stone was a tedious and time consuming task, taking days, weeks or months for the completion of a single tablet. Since the advent of higher technologies, protruding surfaces were frequently formed by molding a plastic material, by etching and by metallic embossing wherein an embossing die is forced into one surface of a relatively thin sheet or plate causing an elevated portion or boss on the reverse surface of the sheet or plate.

Since thermoplastic organic polymers have been available, various methods have been tried for forming bosses using such polymers. Such methods have not been entirely satisfactory particularly when a very high gloss surface is desired. For example, such thermoplastic polymers have been molded by casting. Casting techniques, in the absence of pressure, have not always been satisfactory since the thermoplastic polymer did not always reach all mold crevices. Furthermore, mold marks caused by machining and polishing, as well as the presence of dirt on the mold surface, often unacceptably reduced the gloss of the finished article. Furthermore, the manufacture of molds for such thermoplastic polymers is exceedingly time consuming, intricate and costly. Another molding method, injection molding, wherein high pressure is used, practically eliminates the problem of the thermoplastic reaching all areas of the mold; however, the molds required for injection molding are even more costly and difficult to manufacture. Furthermore, the surfaces of injection molded articles may contain undesirable flashing, i.e., leaking or extrusion of plastic into the cracks between mold halves or into orifices. Even with high polish, such molds still often do not permit a gloss as high as desirable.

Such molding methods, as above described, are particularly undesirable for the manufacture of articles having organic plastic bosses wherein small numbers of articles are desired due to the difficulty of mold manufacture and resulting high cost per article. Furthermore, when molds are used for manufacturing articles having bosses, rapid set up time to manufacture the articles is virtually impossible due to the lengthy mold manufacturing process.

Attempts have been made to manufacture organic plastic articles having bosses by pouring a solidifiable liquid plastic onto the surface to form a protrusion which remained somewhat elevated due to surface tension of the liquid plastic. It was subsequently discovered that if the liquid plastic either flowed to a sharp peripheral edge or it was poured into a cavity, better relief and definition could be obtained.

More recently, in order to avoid the problems with forming cavities, a retaining edge or dam was screened onto the face of a plastic sheet. The dam then acted as a retaining wall to hold the liquid plastic. Such screening processes are still more complex than desired and do not result in retaining dams which are as efficient as desired.

As described in co-pending patent application Ser. No. 220,087 filed Dec. 24, 1980, now U.S. Pat. No. 4,353,858 which issued Oct. 12, 1982 dams for holding the liquid plastic, before solidification, can be formed by forming a debossed pattern surrounded by a ridge at the edges of the debossed zone. Such dams are more efficient in retaining the liquid plastic; however, they still require deformation of the surface which is not always desirable or possible and which requires the manufacture and use of debossing dies.

BRIEF DESCRIPTION OF THE INVENTION

In accordance with the invention, there is provided an article which comprises a base provided with a surface having a surface energy greater than 30 dynes per centimeter and having a surface pattern. The surface pattern has at least one edge or boundary defined by at least one continuous retaining means. At least a portion of the retaining means is a contiguous low energy surface having a surface energy of between about 5 and about 20 dynes/cm. The invention further comprises the above article wherein a volume of hardened resin covering only the surface pattern is provided. The volume of the hardened resin has an upper surface elevated above the article surface. The hardened resin therefore forms a boss upon the article.

The invention further comprises a method for forming a boss upon an article surface having a surface energy greater than 30 dynes per centimeter which method comprises forming at least one continuous retaining means on the surface. The retaining means defines a boundary of a pattern area. The method further comprises introducing a liquid resin into the pattern area. The liquid resin is provided in a quantity sufficient to form a liquid resin surface elevated above the article surface and in a quantity insufficient to flow past the retaining means due to the force of gravity. The method further comprises, as a third step, solidifying the liquid resin to form an elevated boss while the boundary of the pattern area is in an essentially horizontal plane. At least a portion of the retaining means is a contiguous low energy surface having a surface energy of between about 5 and about 20 dynes per centimeter. The contiguous surface is formed at least partially from a low surface energy compound.

The liquid resin, which is introduced into the pattern area, is solidifiable at a temperature below the deformation temperature of the article surface and below the decomposition temperature of the low surface energy compound. The liquid resin has reaction and solubility rates with the article surface and with the low surface energy compound which is sufficiently slow to prevent significant weakening or destruction of the article surface or contiguous surface prior to and during solidification of the liquid resin. Desirably, the entire retaining means is completely formed from the contiguous low energy surface.

DETAILED DESCRIPTION OF THE INVENTION

Figure 1:
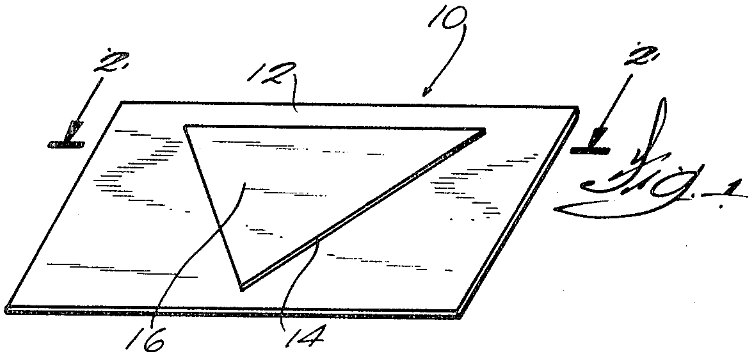
FIG. 1 is a top perspective view of an article in accordance with the invention showing a retaining means which comprises a contiguous low energy surface.

The boss which is formed upon the article surface is simply an elevated portion protruding from the surface. Such bosses, when they are transparent and have exceedingly high gloss, smooth surfaces, are frequently known in the art as lenses. The surface upon which the boss is formed, in accordance with the invention, is an essentially planar, desirably, but not necessarily, non-porous surface. "Essentially planar", as used herein, means that the periphery or boundary of the surface area is generally located within the same plane, although slight deviations of the boundary from a single plane can be tolerated, e.g., deviations of less than about 2 millimeters due to surface roughness. In addition, deviations from the single plane within the surface defined by the boundary, usually the periphery, can also be tolerated. Deviations which vary from the plane defined by the boundary, e.g., the periphery, of the surface area by a distance greater than the depth of the boss of the deviation point are not usually desirable. The depth of the boss, at a particular location, is considered to be the distance from the surface of the boss to the plane defined by a boundary, preferably the periphery of the surface area.

The non-porous surface, in general, may be manufactured from any non-porous material having a surface energy greater than 30 dynes per centimeter. The material is desirably wettable by polar liquid plastic materials such as oxygen and nitrogen containing plastic polymers. Examples of such materials are metals, plastics, glasses and ceramics. The article substrate should be non-porous; however, coated porous substrates such as coated paper board can be used. Examples of common article substrates forming the article surface are iron, steel, aluminum, copper, brass, nickel, chromium, zinc, silicate glass, porcelain, aluminum oxide and both thermosetting and thermoplastic polymers. Examples of especially suitable thermoplastic polymers are linear polycarbonates, modified cellulosics, polyesters, acrylics, polyamides and polyvinyl polymers.

In general, the polycarbonates are those polycarbonates commercially known, which in general are prepared by the reaction of bisphenols with phosgene or by transesterification of diphenyl carbonate and bisphenols. Examples of cellulosics are cellulose acetate, rayon, cellulose nitrate and especially cellulose acetate butyrate. Examples of polyesters are those polyesters which are the reaction product of a dihydric alcohol and terphthalic acid. Examples of acrylics are the acrylonitriles and especially polyacrylates and polymethacrylates. Examples of polyamides are the nylons and examples of polyvinylpolymers are polyvinylacetate, polyvinylchloride, polystyrene and polyolefins including polyethylene, polypropylene, polyvinylchloride and polyvinylidenechloride.

Examples of thermosetting polymers are diallyl phthalate polymers, melamine-formaldehyde polymers, phenyl-formaldehyde polymers, phenyl-furfural polymers, polyacrylic esters, alkyd polymers, urea-formaldehyde polymers, urethanes, epoxies and cross linked polyesters.

In accordance with the method of the invention, at least one continuous retaining means is formed on the surface. At least one of the continuous retaining means defines an edge or boundary of a pattern area. At least a portion of at least one of the retaining means is a contiguous low energy surface formed at least partially from a low surface energy polymer which has a surface energy of between about 5 and about 20 dynes per centimeter. Usually the boundary of the pattern area at the article surface lies within a single plane but optionally may deviate from a single plane by a distance not greater than 2 millimeters. The pattern area itself may be planar or non-planar but desirably, although not necessarily, does not deviate from the plane of the boundary by more than 2 millimeters. The "plane of the boundary", as used herein, means the plane which passes through the maximum possible number of points in the boundary. The periphery is the external boundary and the plane of the boundary is preferably the plane of the periphery.

As previously mentioned, a portion of at least one of the retaining means is a contiguous low energy surface. Other retaining means may or may not comprise a contiguous low energy surface. Any such retaining means may completely consist of such a contiguous low energy surface or may partially comprise such a surface. Portions of such retaining means, which are not in the form of a contiguous low energy surface, may be any other suitable form which will retain liquid resin. Such forms as known in the prior art include terminal edges and elevated ridges or dams.

The low surface energy compound forming a part of the contiguous low energy surface may be essentially any compound having a surface energy of between about 5 and about 20 dynes per centimeter. Such compounds should also usually be easily dispersed or dissolved in a liquid carrier. Such compounds are generally fluorochemicals and usually, but not necessarily, polymerized fluorinated monomers such as fluorinated alkylenes, e.g., trifluoroethylene; and polymerized fluorinated alkylacrylates such as polypentadecafluorooctylacrylate and poly-N-propyl, N-ethyleneacrylate, perfluorooctylsulfonamide. Many other polymerizable fluorinated sulfonamides can also be used. Such low surface energy polymers are sold by DuPont and 3-M under the trademarks Zepel® and Scotchguard® respectively.

The portion or portions of the retaining means, which is a contiguous low energy surface, is usually formed by printing the surface with a composition containing the low surface energy compound. In general, the composition comprises a carrier for the compound in which the low surface energy compound is dissolved or dispersed. The carrier may simply be a solvent or combination of solvents such as halogenated hydrocarbons and alcohols. The liquid carrier may optionally contain other dissolved or dispersed solids or may contain other components. In addition to other solvents, the carrier, for example, may comprise a conventional ink or ink base which can dissolve or disperse the compound or its solution in other solvents. An example of such an ink base comprises ethylene glycol monobutylether, aromatic petroleum distillate having a distillation range between about 100° and 250° C. and dissolved nitrocellulose. As a specific example, such an ink base could contain from about 10 to about 35 weight percent nitrocellulose; from about 50 to 80 weight percent ethylene glycol monobutylether and from about 5 to about 15 weight percent of a liquid aromatic distillate. Desirable printing compositions usually require only from about 0.01 to about 2% fluorochemical with the balance being carrier.

Other suitable solvents for use in dissolving or dispersing the low surface energy polymer are ethers, 1,1,1 trichloroethane, liquid fluorinated hydrocarbons and liquid ketones. The selection of the solvent in the medium is strongly dependent upon the nature of the low surface energy compound. For example, when the compound has essentially no polar groups, hydrocarbon or halogenated hydrocarbon solvents may be suitable; whereas, when polar groups are present in the low surface energy polymer, more desirable solvents might be ethers, ketones and some alcohols.

The low surface energy compound is in general a fluorochemical, usually a fluorinated polymer, having the following characteristics. The compound should be essentially non-volatile at ambient temperatures and baking temperatures where the medium requires thermoprocessing. The low surface energy compound should not be wettable by polar liquids such as ketone and alcohols. The low surface energy compound should not attack the article surface. The low surface energy compound should be essentially compatible with the medium or vehicle to which it is added. It is not necessary for the low surface energy compound, e.g., fluorochemical polymer, to be totally soluble in the vehicle. A small degree of incompatibility may in fact be beneficial since such incompatibility may help orient fluorochemical groups at the liquid-air interface. In cases of low solubility, co-solvents may be beneficial. The low surface energy compound should have as low a surface energy as possible, desirably below 20 dynes per centimeter. In general, the compound when mixed with the vehicle and applied to the surface and cured, should retain isopropyl alcohol to form a contact angle of at least 35° and preferably at least 45°.

As previously discussed, the low surface energy compound is usually a fluorochemical since most silicone polymers and chemicals and other low surface energy compounds have not been found to have surface energies as low as desirable or because exceedingly large quantities of compounds, other than fluorochemicals are required.

Silicone fluids in general are undesirable since they have a tendency to contaminate printing, painting and graphic arts operations. When a small amount of silicone becomes airborne, it can contaminate substrates throughout an entire plant. Once a substrate is contaminated with silicone, it is difficult to coat and decorate the substrate since a phenomenon called "fish eyes" occurs which are bubbles in the surface coating. The use of fluorochemical polymers and surfactants, however, appear to avoid this problem.

The portion of the retaining means which is a contiguous low energy surface, is generally formed by printing the compound onto the surface in a printing composition or vehicle, although other methods for forming the retaining means such as hot stamping or sublimation printing can be used. It is generally desirable to prepare a clear or colored printing vehicle by adding the fluorochemical to the vehicle in quantity sufficient to provide a sufficiently low surface energy. The quantity of fluorochemical required to be added to the vehicle can be easily determined by one skilled in the art but as previously discussed, is usually between 0.01 to about 2 weight percent. Higher percentages of fluorochemical can be used without detriment since the carrier is present only as an aid in applying the low surface energy compound. The quantity of the fluorochemical is dependent upon the nature of the article surface, the nature of the liquid resin, the vehicle and the fluorochemical. It is usually found that large improvements in the possible height of liquid resin within the retaining means occurs upon increasing the fluorochemical level up to a point. After the maximum height is reached, further additions cause little or no discernible change. Apparently, the surface energy of the ink (when applied and cured) has approached the value of the pure fluorochemical. Certain fluoropolymers can be used by application without additives, e.g., when they have film forming properties. Such fluoropolymers can be applied by any suitable method such as pad printing, screen processing and sublimation printing.

Various printing methods can be used although screen printing and pad or tampon printing are very suitable processes. Both processes may be used to apply a retaining contiguous low energy surface to coarse as well smooth surfaces. For example, matte polycarbonate can be easily printed using these methods.

After the printing composition is applied, it is usually heat dried or cured at a suitable temperature which is usually from about 35° to 250° C. for from about 1 to about 15 minutes.

The vehicle containing the fluorochemical can be applied as a thin border or as a solid background for the liquid resin in any desired shape. For example, circles and rectangles can be printed so as to form borders around numerical graphics in the case of electronic switch face plates. The height or thickness of the low energy surface apparently has little effect; therefore, the contiguous low energy surface is kept very thin to conserve material and for aesthetic purposes. The thickness is usually between about 2.5 and 25 microns.

If retaining means are used, in addition to the contiguous low energy surface, they may be formed by known methods including embossing and screening.

In accordance with the method of the invention, desirably, while the plane of the boundary is essentially horizontal, a liquid resin is introduced into the pattern area in a quantity sufficient to form a liquid resin surface elevated above the article surface and in a quantity insufficient to flow pass the retaining means due to the force of gravity. After the liquid resin is introduced into the pattern area, the plane of the boundary may be varied from essentially horizontal in order to cause the liquid resin to flow into all areas of the pattern area. Such variance is usually less than 45° from the horizontal. "Essentially horizontal", as used herein, means a variance from the horizontal of less than about 10°. After the liquid resin is caused to cover the pattern area without overflowing the continuous retaining means, the boundary of the pattern area is again placed in a plane which is essentially horizontal and which desirably varies from the horizontal by less than about 2°.

The liquid resin is a resin which is solidifiable at a temperature below the deformation temperature of the article surface, i.e., the temperature at which the article surface would be significantly weakened. In the case of thermoplastic polymers, the deformation temperature is near the Vicat Softening Point (ASTM D1525). The liquid resin is chosen so that the liquid resin has reaction and solubility rates with the article surface and low surface energy compound which are sufficiently slow to prevent significant weakening or destruction of the article surface or contiguous surface prior to and during solidification of the liquid resin. "Significant weakening", as used herein, means weakening which would cause the article surface or contiguous surface to change shape, be visibly altered or be removed.

Suitable liquid resins are catalyzed urethanes, catalyzed epoxies and radiation curable polymers. Such resins also include heat curable polymers, which are cured at a temperature below the melting or deformation temperature of the article surface or decomposition or vaporization temperature of the low surface energy compound. An example of a radiation cured polymer is the polymer formed from a radiation curable prepolymer containing radiation linkable polythiol and polyene groups. Such a radiation curable prepolymer is a resin known as AM 15D provided by W. R. Grace. Thermoplastic polymers may also be used as the solidifiable liquid resin provided that the melt temperature of the thermoplastic polymer is well below the deformation temperature of the article surface.

The quantity sufficient to form a liquid resin surface elevated above the article surface is obviously any quantity of resin which will completely cover the pattern area. The quantity insufficient to flow past the retaining means due to the force of gravity is usually less than the volume determined by multiplying the area of the pattern area times 3 millimeters. With viscous materials, before equilibrium is reached, the quantity insufficient to flow past the retaining means may be substantially greater.

The liquid resin and article surface can, of course, react with each other or dissolve in each other, provided that such reaction or dissolving does not occur so rapidly that the liquid resin cannot practically be solidified in time to prevent signicant weakening of the article surface. Similarly, the liquid resin can react with the low surface energy compound. In general, any reaction or solubility with the liquid resin which occurs in a time period in excess of ½ hour, which would significantly weaken the article surface or destroy the contiguous low energy surface is permissible since the liquid resin would be solidified in practical processes before the expiration of a ½ hour time period. Such reaction in solubility rates are sufficiently slow to prevent such weakening or destruction before solidification of the resin. Reaction or solubility rates which would significantly weaken the article surface or destroy the low energy surface in a time period of less than one minute are usually not considered acceptable since hardening times may exceed the one minute time period and since pauses or interruptions in the resin hardening process due to process equipment malfunctions could not be tolerated. Reaction and solubility rates are much less critical when radiation curable polymers are used because hardening can occur in seconds.

The article surface can be coated with a thin primer coating when the rate of solubility or reaction with the liquid resin would otherwise be too high. Such coatings can also be used to reduce surface porosity, when the porosity is too high to permit the formation of a good continuous retaining means.

It is actually desirable for the liquid resin to be somewhat soluble or reactive with the article surface to create good adhesion between the solidified resin and the article surface. In order to increase the adhesion between the article surface and the resin, the article may be coated with an adhesive substance (adhesive primer) such as polyvinyl adhesive.

After the liquid resin is introduced into the pattern area, it is solidified. The solidification conditions may vary in accordance with the resin chosen. In the case of a radiation cured liquid resin, the resin is exposed to U.V. radiation to harden the liquid resin composition. In the case of a two part liquid resin composition, the two resin parts are premixed prior to introducing the liquid resin into the pattern area and the resin is permitted to harden at ambient or elevated temperature depending upon the hardening requirements. In the case of single part liquid resins, which are heat curable, the resins are simply exposed to the required temperature for the required period of time provided the temperature required is below the deformation temperature of the article surface. Other single part liquid resins may be hardened upon exposure to air as in the case with moisture cured silicones and urethanes. Thermoplastic polymers which are liquid at a temperature above ambient temperature but below the deformation temperature of the thermoplastic polymer of the surface and decomposition or vaporization temperature of the low surface energy compound may also be used as the liquid resin. Such thermoplastic polymers are melted and introduced into the pattern area at a temperature below the deformation of the article surface and below the decomposition or vaporization temperature of the low surface energy compound. The liquid thermoplastic polymer is then permitted to cool.

Figure 2:
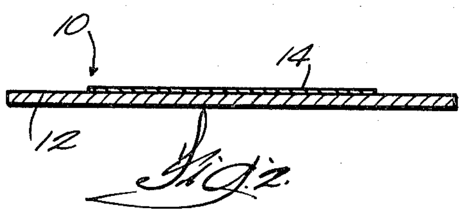
FIG. 2 is a cross sectional view taken along line 2—2 of FIG. 2.

In order to more fully understand the method and article of the invention, reference may be had to the drawings. Referring to FIG. 1, an article 10 having a surface 12 is provided with a continuous retaining means 14 in the form of a contiguous low energy surface which defines the boundary or periphery of a pattern area 16. A cross sectional view of the article, as seen in FIG. 2, shows that contiguous low energy surface 14 is exceedingly thin relative to the thickness of article 10. In general, the thickness of the contiguous low energy surface retaining means is less than about 25 microns, preferably less than 10 microns and most preferably less than about 2.5 microns. Thicker contiguous low energy surfaces can be used; however, increasing the thickness has not been found to be particularly beneficial and therefore requires unnecessarily increased quantities of material to form the contiguous low energy surface.

Figure 3:
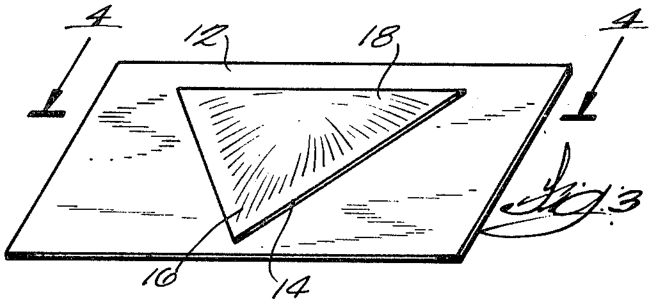
FIG. 3 is a top perspective view of an article in accordance with the present invention showing a volume of hardened resin covering the surface pattern of the article.
Figure 4:
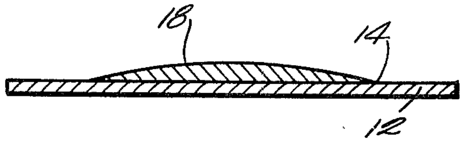
FIG. 4 is a cross sectional view taken along line 4—4 of FIG. 3.

As best seen in FIG. 3, liquid resin 18 is introduced into pattern area 16 which is then solidified to form a boss upon surface 12. The liquid resin is introduced into the pattern area preferably while periphery or contiguous low energy surface retaining means 14 is held in an essentially horizontal plane.

The following examples serve to illustrate and not limit the present invention. Unless otherwise indicated, all parts and percentages are by weight.

EXAMPLE 1

A printing composition comprising 30 grams of Nazdar IL-170 ink vehicle containing about 32% nitrocellulose, 54.5% butylcellusolve and 13.5% SC-150 aromatic solvent was blended with 10 grams of FC-860, a fluorochemical polymer in a solvent vehicle manufactured by Minnesota Mining and Manufacturing Company believed to be 0.75 weight percent of a polymeric fluorinated alkyl sulfonamide as previously described dissolved in a mixture of halogenated solvent and alcohol. The printing composition was then printed in the shape of a ¾" diameter circle with approximately a 1/32" width onto the article surface. The surface was the surface of an ABS plastic extruded sheet having a thickness of about 0.04 centimeters. A pad printer was used to apply the ink. After the composition was applied, it was baked at about 100° C. for about 10 minutes. The pad printer applied a very thin layer of ink so that the circles printed had no thickness measurable by a standard micrometer. A radiation curable polythiol-polyene liquid resin (W. R. Grace 15D) was then applied to the center of the circle by means of a dropper. It was found that 0.5 grams of the liquid resin could be place in the circle pattern area without overflowing the printed periphery or boundary. After one minute, the liquid remained neatly at the edge of the circle. Upon exposure to ultraviolet radiation, the resin hardened to form a well defined circular shape having a height of about 2 millimeters.

EXAMPLE 2

Example 1 was repeated except that the liquid resin was allowed to stand for five minutes after being deposited within the pattern area. None of the liquid wetted the printed contiguous low energy surface forming the periphery of the circle. Even tilting the sheet slightly (5°-10°), for a brief period of time, out of the horizontal plane did not cause the liquid resin to run over the contiguous low energy surface.

EXAMPLE 3

Example 1 was repeated except that the 0.6 grams of liquid resin was placed within the circle. Again the low energy surface was completely unwetted by the liquid resin. Upon hardening with ultraviolet light, a well defined circular crown was formed with a height of about 2.5 millimeters.

EXAMPLE 4

Example 1 was repeated except that 10 grams of FC-860, containing 0.75 weight percent flurochemical with the balance being halogenated hydrocarbon solvent and alcohol, and 20 grams of Nazdar IL-170 were used in the printing composition. Using the modified printing composition, it was possible to form a well defined circular dome containing from 0.60 to 0.65 grams of resin with a height of over about 2.5 millimeters.

EXAMPLE 5

As a control, Example 1 was repeated except that fluorochemical was not added to the Nazdar IL-170 clear ink vehicle. When the liquid resin was applied to the center of the circle by means of a dropper, liquid flowed over the printed boundary in less than a minute when only 0.1 to 0.2 grams of liquid resin were added and while the ABS extruded plastic sheet was held horizontally.

EXAMPLE 6

Example 1 was repeated except that Dow Corning 200 silicone oil was substituted for the fluorochemical in the IL-170 ink vehicle at concentrations of 0.25%, 1%, 2% and 3%. In each case, the liquid resin easily flowed over the printed boundary even when as little as 0.1 grams of resin was used.

It was further found that the addition of the silicone to the IL-170 ink vehicle containing the fluorochemical, actually reduced the retaining power of the printed boundary.

What is claimed is:

1. An article comprising
   - a base including a non-porous surface having a surface energy greater than 30 dynes per centimeter and a pattern area on said surface,
   - a continuous, raised retaining means defining a boundary enclosing said pattern area, at least a portion of said retaining means being formed by a continuous strip of a hardened boundary-forming composition which is applied as a liquid and contains a low surface energy of about 5 to about 20 dynes per centimeter; and
   - a solidified resin which is applied as a liquid, adheres to said surface and completely covers said pattern area at a depth greater than the height of said retaining means without extending over said retaining means.

2. An article according to claim 1 wherein said retaining means in completely formed from said boundary-forming composition.

3. An article according to claim 2 wherein said boundary-forming composition is applied by printing.

4. An article according to claim 1 wherein said surface comprises a polymer selected from the group polyesters, acrylics, polyamides, and polyvinyl polymers and thermosetting prepolymers.

5. An article according to claim 1 wherein the resin is selected from the group of catalyzed urethanes, catalyzed epoxies, radiation curable polymers, and heat curable polymers.

6. An article according to claim 1 wherein said low surface energy compound is a fluorocarbon.

7. An article according to claim 6 wherein said fluorocarbon is selected from the group consisting of polymers and copolymers perfluoro alkyl acrylates, polyperfluoroalkysulfamidoalkanol esters and polyperfluoroalklsulfamidoalkanol urethanes.

* * * * *